US007217113B2

(12) United States Patent
Dräger et al.

(10) Patent No.: US 7,217,113 B2
(45) Date of Patent: May 15, 2007

(54) PROCESS AND INSTALLATION FOR THE MANUFACTURING OF A COATING FOR AN IMPRESSION CYLINDER

(75) Inventors: Udo Dräger, Speyer (DE); Detlef Schulze-Hagenest, Molfsee (DE)

(73) Assignee: Eastman Kodak Company, Rochester, NY (US)

( * ) Notice: Subject to any disclaimer, the term of this patent is extended or adjusted under 35 U.S.C. 154(b) by 439 days.

(21) Appl. No.: 10/695,315

(22) Filed: Oct. 28, 2003

(65) Prior Publication Data

US 2004/0212129 A1 Oct. 28, 2004

(30) Foreign Application Priority Data

Nov. 6, 2002 (DE) ................................ 102 51 616

(51) Int. Cl.
*B06B 1/02* (2006.01)
*B29C 33/60* (2006.01)
*B29C 41/20* (2006.01)

(52) U.S. Cl. ...................... 425/120; 425/127; 425/130; 425/174.2; 425/425; 249/131; 118/612; 29/895.32

(58) Field of Classification Search .................. 249/83, 249/109, 131; 425/117, 120, 127, 174.2, 425/425, 472, 130; 29/895.32; 118/612; 264/239, 260, 443
See application file for complete search history.

(56) References Cited

U.S. PATENT DOCUMENTS

| | | | | | |
|---|---|---|---|---|---|
| 2,808,344 | A | * | 10/1957 | Kaulen et al. | 430/300 |
| 3,087,201 | A | * | 4/1963 | Williams et al. | 264/257 |
| 3,184,828 | A | * | 5/1965 | Dames, Jr. | 492/45 |
| 3,209,723 | A | * | 10/1965 | Schrodersecker | 118/64 |
| 3,451,104 | A | * | 6/1969 | Andrepont | 425/130 |
| 3,724,983 | A | * | 4/1973 | Nelson | 425/129.1 |
| 4,288,058 | A | * | 9/1981 | Inman | 249/134 |
| 4,892,696 | A | * | 1/1990 | Murakami et al. | 264/219 |
| 5,753,165 | A | * | 5/1998 | Watanabe et al. | 264/138 |
| 6,481,995 | B2 | * | 11/2002 | Delrosario et al. | 425/123 |
| 6,767,489 | B2 | * | 7/2004 | Bracken et al. | 264/83 |

* cited by examiner

*Primary Examiner*—Robert B. Davis
(74) *Attorney, Agent, or Firm*—Lawrence P. Kessler

(57) ABSTRACT

Manufacturing a coating for an impression cylinder whereby a carrier and a cylinder shape is provided. A hollow cylinder is positioned between the carrier and the cylinder shape, and material to form the coating in the spaces is introduced between the carrier and the hollow cylinder (the internal field) and between the hollow cylinder and the cylinder shape (the external field). The hollow cylinder is removed at a certain pre-selected velocity from between the carrier and the cylinder shape.

4 Claims, 3 Drawing Sheets

PROCESS AND INSTALLATION FOR THE MANUFACTURING OF A COATING FOR AN IMPRESSION CYLINDER

FIELD OF THE INVENTION

The invention concerns a process and an installation for the manufacturing of a coating for an impression cylinder.

BACKGROUND OF THE INVENTION

In the field of printing technology, different cylinders of printing machines have respective coatings, which serve certain distinct functions. For instance, in the case of electrographic printing, the image generation cylinder, or illustration drum, are often coated with an organic photoconductor on which the latent images are formed. A blanket cylinder, which is used in particular during offset printing and also in the capacity of a transfer drum in toner-based digital printing, and the fuser roller for fixing the print toner on the impression material at another printing pace in the printing machine, are usually coated with an elastomer.

A significant aspect in the avoidance of image degeneration and for the assurance of the printing result, for instance in electrophotographic printing, is the formation of the surface of the illustration drum or the transfer drum with the highest precision. On the basis of wear and tear at the surface of the illustration drum, these drums, as well as transfer drums and fuser rollers are replaced from time to time. The aforementioned high-precision drums and the surface quality maintenance requirements connected to the substitution of new/replacement surfaces are, however, costly and time-consuming.

The surface of transfer drums are known as thin cuffs, also called sleeves, and are self-supporting, and are assembled on a core which serves as carrier. If the surface has worn out, only the coating or the coating together with the thin cuff are substituted where the coating is connected. The carrier of the coating and the coating with the thin cuff or sleeve may continue to be used. Demands on the coating involve minor wall thickness of the coating and low production costs. Depending on the particular cylinder use, further demands may involve an even electrical and/or thermal conductivity, photoconductivity, or an equal wall hardness and elasticity along the coating. The foregoing demands are met in which multiple layer technologies are applied which are, however, disadvantageous since these require a time-consuming and expensive production process. Multiple layers are arranged one after the other in order to form a coating in the known process whereby the layers are each cooled down or hardened before applying the next layer, which results in a long production time.

SUMMARY OF THE INVENTION

The objective of the invention is to prepare a coating for an impression cylinder which exhibits a certain hardness, elasticity, electrical conductivity, thermal conductivity or photoconductivity, and which is easily and quickly producible.

A procedure for the manufacturing of a coating for an impression cylinder, whereby a cylinder shape is provided for, includes inserting a hollow cylinder between a carrier and a cylinder shape, and inserting material for creating the coating in the space between the carrier and the hollow cylinder (the internal field) and the hollow cylinder and the cylinder shape (the external field). The hollow cylinder is thereafter removed from between the carrier and the cylinder shape at a certain pre-determined velocity. Furthermore, an installation is provided for manufacturing a coating for an impression cylinder featuring a carrier, a cylinder shape, and a hollow cylinder, to be introduced between the carrier and the cylindrical shape, as well as a drive unit to control the velocity of the hollow cylinder.

In an embodiment of the invention, the hollow cylinder is removed from the carrier and cylindrical shape at a pre-selected constant velocity whereby uniform characteristics along the thickness of the coating are achieved. The uniform characteristics of the coating lead to an equal printing format.

In an additional embodiment of the invention, the cylinder is increasingly removed from the carrier and the cylindrical shape at an increasing velocity, whereby specifically non-uniform characteristics along the length of the coating are achieved. In this way for instance the non-uniform actions of force on the coating are compensatable, fields of the coating on which higher forces have an effect, display a higher hardness as fields of the coating on which lower forces have an effect.

The use of ultrasound will substantially facilitate the insertion of material into the spaces between the cylindrical walls in the external and internal fields. The ultrasounds promote the flow of the material and enable an even distribution of the material.

In an advantageous embodiment, the internal surface of the cylindrical shape is equipped with a separating agent for an improved detaching of the cylindrical shape from the coating, whereby the parting of the coating from the internal surface is simplified after the process of manufacturing. A nickel layer with a density of 125 μm is advantageously provided, as well as a primer layer and a thermally hardenable polyurethane layer with a density of 10 mm.

BRIEF DESCRIPTION OF THE DRAWINGS

The following gives descriptions of the invention on the basis of the figures, in which.

DETAILED DESCRIPTION OF THE INVENTION

Figure 1:
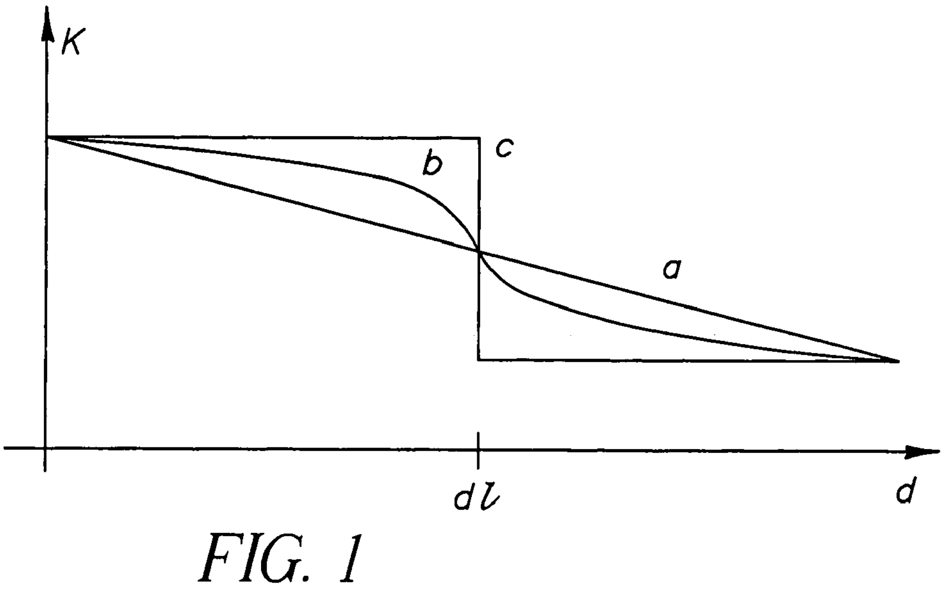
FIG. 1 shows a qualitative curvature of a coating characteristic as a function of the thickness of the coating.

FIG. 1 shows a qualitative curvature of material property K of coating 2, for a hollow cylinder 5, as function of density d of coating 2. Coating 2 is formed from a material that is inserted in internal field 8 in between carrier 1 and cylinder 5, and external field 7, between cylinder 5 and cylinder shape 10. Material characteristic K of coating 2 along density d of coating 2 is functionally included. Material characteristic K of coating 2 indicates the material hardness of coating 2, the elasticity, electrical conductivity, photoconductivity or the thermal conductivity of coating 2.

The curvatures are indicated by the letters a, b, and c. Curve a, marks with regard to quality the behavior of the aforementioned material characteristic K when using an embodiment of the invention. The curvature of curve a steadily drops as a function of density d of coating 2, in other words, the corresponding material characteristic K shows a continual gradient. Curve b marks a curve similar to curve a, however, with a turning point approximately at density dl. Curve c describes a curvature of an embodiment of the invention. This one runs constantly until length dl and then drops steeply, after which curve c continues to run constantly.

The curvature according to curve c is a typical curvature when two layers are mounted on cylinder 5 after and on top of one another, as is the case with the status of technology. The first layer ends at thickness dl, the second layer begins behind thickness dl according to FIG. 1. With regard to the curvatures according to FIG. 1, the velocity increases with which cylinder 5 is removed from curve c to curve b and from curve b to curve a.

Figure 2:
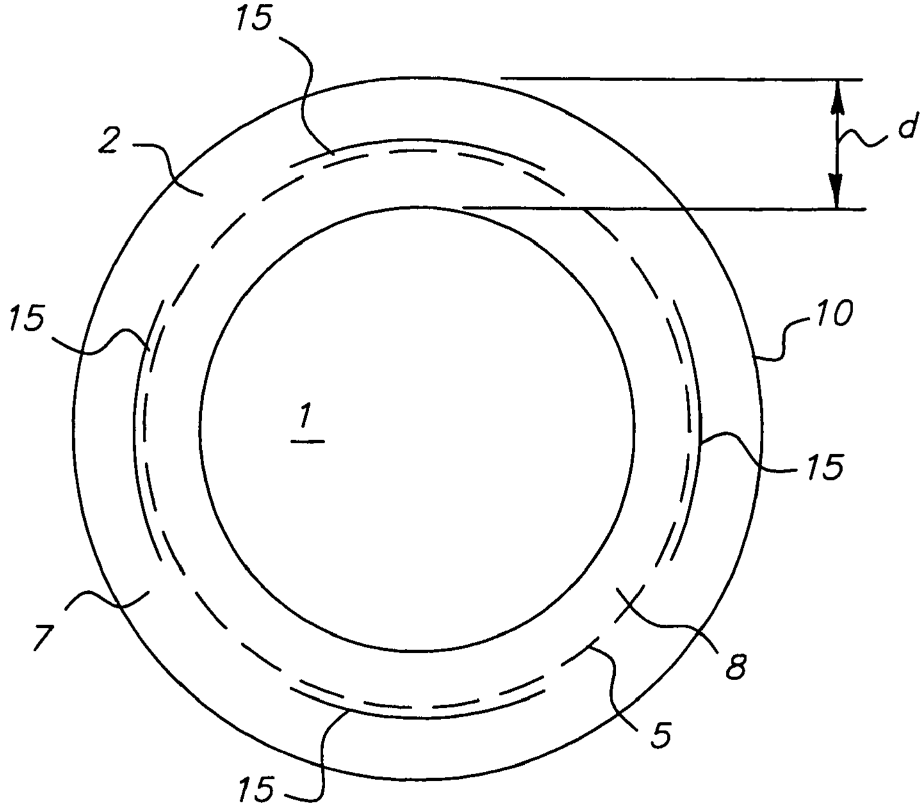
FIG. 2 shows a schematic view from above on the coating for an impression cylinder on a carrier with a cylindrical shape, as well as a hollow cylinder.

FIG. 2 displays a schematic top view of an installation to manufacture coating 2, for example, for an impression cylinder of an electrographic printer. In order to form the impression cylinder, a fixture 4 is provided in which a carrier 1 is located as is a cylindrical shape 10, which shows a larger diameter than carrier 1, as well as hollow cylinder 5 between carrier 1 and cylindrical shape 10. Carrier 1 can be a solid shape or it can be hollow, and the cylindrical shape 10 is hollow. Coating 2 can be immediately placed on the cylinder so that carrier 1 corresponds with an impression cylinder in this case.

For instance, carrier 1 can be a thin elastic metal tube made of nickel, aluminum, or a strengthened polymer. Carrier 1 is of a smaller size than external cylindrical shape 10. Carrier 1 and cylindrical shape 10 are closed at their respective ends whereby openings are provided at one end of cylindrical shape 10 which can be closed. The exterior of carrier 1 and the interior of cylindrical shape 10 exhibit a high degree of surface smoothness. It is preferential that the exterior of carrier 1 shows a coating.

Hollow cylinder 5 is displayed by a dotted line, which is located between carrier 1 and cylindrical shape 10. Curved rails 15 are laid out above carrier 1 and cylindrical shape 10, the purpose of which is to transport cylinder 5, along the side surfaces of curved rails 15 when cylinder 5 is removed from carrier 1 and cylindrical shape 10 (see FIG. 4). Curved rails 15 are formed in such a way that these rails have been adapted to the curving of the outer surface of cylinder 5 and which enable the sliding of the outer surface of cylinder 5 along the inner surfaces of curved rails 15. The rails 15 are preferably made of synthetic material.

Figure 3:
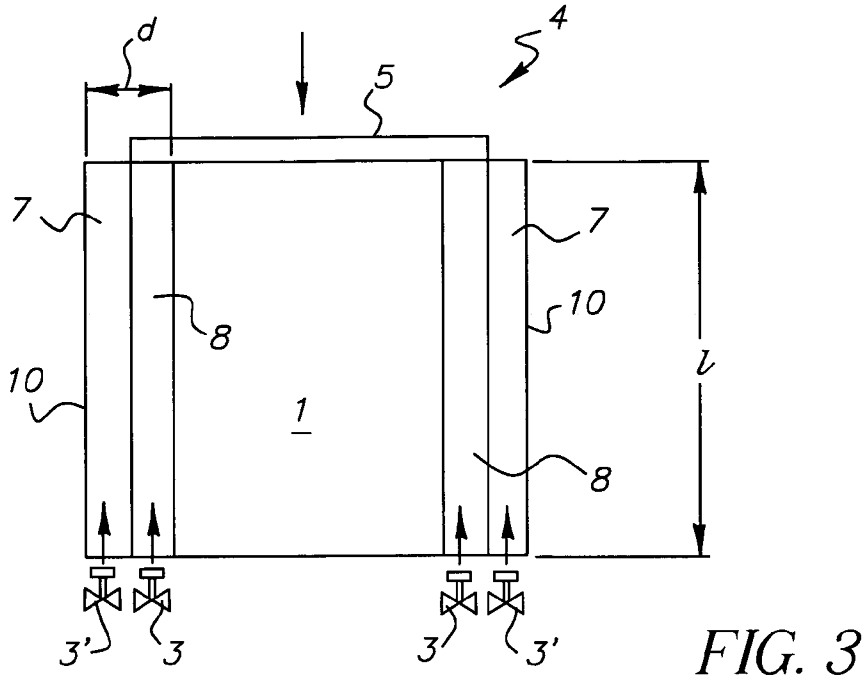
FIG. 3 shows a schematic side profile of a coating for an impression cylinder on a carrier with a cylindrical shape as well as hollow cylinder, with valves for injection molding of the material.

FIG. 3 is a lateral view of carrier 1 and a hollow outer cylindrical shape 10 which encompasses carrier 1 that lies on the inside. Hollow cylinder 5 is inserted in the space between carrier 1 and cylindrical shape 10. Cylinder 5 separates the space between carrier 1 and cylindrical shape in two areas, an inner area 8 and an outer area 7. Openings are provided on the bottom of inner area 8 and of outer area 7 for the outer cylindrical shape 10, in which valves 3, 3' are provided and that enable different types of materials to be injected in to inner area 8 and outer area 7, respectively, whereby valve 3 injects a first type of material into inner area 8 and valve 3' injects a second material into outer area 7. The materials are solvent and viscous, for instance, polyethylenterphthalate, or polyurethane. The first and second material, are mixable, and they may differ from one another in their hardness, elasticity, electrical conductivity, photoconductivity, or thermal conductivity.

The different materials are injected into inner area 8 and outer area 7 through valves 3, 3' as the inner area 8 and outer area 7 are being filled up with the material. A first type of material is injected into inner area 8 through the valve 3, and the opening at the bottom of inner area 8 of the outer cylindrical shape 10 is closed off to retain the material in the inner area 8. Simultaneously, a second type of material is injected into outer area 7 through valve 3' and the opening at the bottom of outer area 7 of cylindrical shape 10 is closed off to retain the material in the outer area 7. The flow and even distribution of the material is provided by ultrasonic waves and ultrasound generators 16. That is, in this embodiment, two ultrasound generators 16 are located beneath carrier 1 and cylindrical shape 10 which introduce ultrasonic waves from below in between carrier 1 and cylindrical shape 10. Ultrasonic generators may also be provided above and underneath cylindrical shape 10, whereby ultrasonic waves are introduced from above and below between carrier 1 and cylindrical shape 10. A further improvement of the material flow can be achieved in which ultrasonic waves can be utilized with different sequences.

Figure 4:
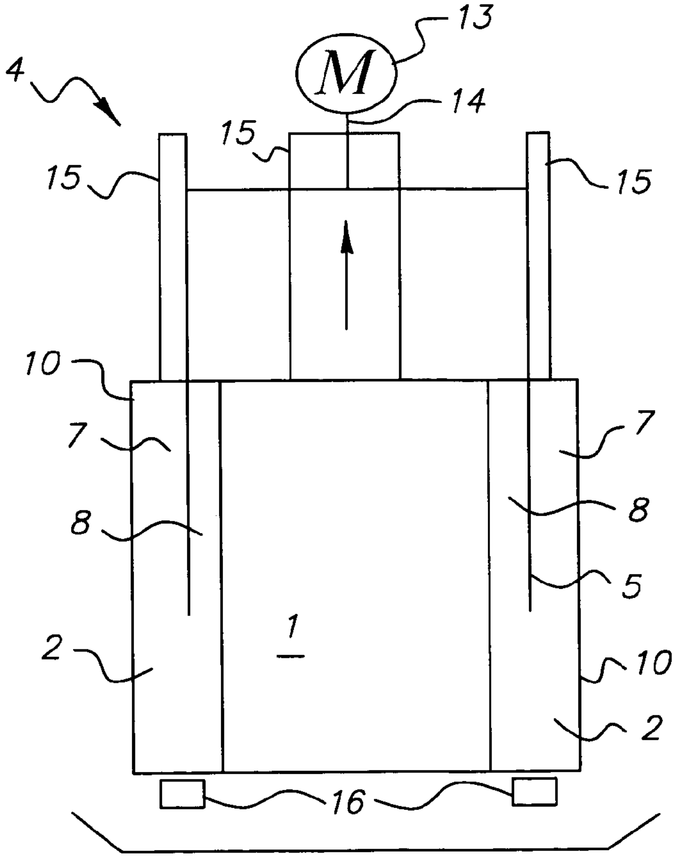
FIG. 4 shows a schematic lateral view of a coating of an impression cylinder with a cylindrical shape, as well as with a hollow cylinder with a drive unit for the controlled removal of the hollow cylinder.

As is shown in FIG. 4, after the materials are introduced respectively into the inner area 8 and the outer are 7, and after appropriate cooling of the fixture 4, the cylinder 5 is removed from carrier 1 and cylindrical shape 10. A drive unit 13 is provided which is connected with hollow cylinder 5 through device 14. Drive unit 13 powers cylinder 5 and moves it, prior to the introduction of the first and second material, in the direction of carrier 1 and cylindrical shape 10. FIG. 3 shows a final condition of the movement of cylinder 5 in which drive unit 13 is halted and cylinder 5 fully partitions the space between carrier 1 and cylindrical shape 10, before and after the filling process. In FIG. 4, the drive unit is in operation and moves cylinder 5 up with the help of device 14 in order to remove cylinder 5 from carrier 1 and outer cylindrical shape 10 following the filling process. The exterior of cylinder 5 is hereby positioned at curved rails 15 and slides along the latter. The purpose of curved rails 15 above carrier 1 and cylindrical shape 10 is to safely, precisely, and in a stable manner remove cylinder 5.

Without control of the velocity of hollow cylinder 5, material characteristics K of coating 2 along the thickness of coating 2 will be obtained according to curve c of FIG. 1. The curvature, describes a constant course until the steep drop of the curve and a constant course that follows it. Coatings 2 are manufactured in a first embodiment, which show a continuous material characteristic K about their overall thickness d. The curvature rises or falls steadily. In order to achieve this, drive unit 13 is operated at a pre-selected constant velocity. In this way, a curvature of the material characteristic K is accomplished according to curve a, of FIG. 1. In order to compensate for edge effects, which distort the curvature at the edges of coating 2, drive unit 13 is operated at the edges at the beginning and end of curvature a at the pre-selected constant velocity while drive unit 13 is working in the other areas at constant velocity. Due to actuation of drive unit 13 and the locomotion of cylinder 5 at the pre-selected constant velocity from carrier 1 and cylindrical shape 10, the materials of inner area 8 and outer area 7 blend because of friction forces and turbulence in such a way that a somewhat linear sloping curvature of the material characteristic K is achieved according to curve a of FIG. 1.

In another embodiment of invention, drive unit 13 is operated at a pre-selected changing velocity. Accordingly, cylinder 5 is moved at the changing velocity from carrier 1 and cylindrical shape 10. As a result thereof, coating 2 is obtained that shows a non-constant material characteristic K with a non-constant curvature. For instance, material characteristic K describes the hardness of coating 2. Thus, in all three curves a, b, and c, of FIG. 1, along thickness d of coating 2, a high hardness is formed in the left area of the curvature and a low hardness in the right area of the curvature. After removing cylinder 5, the first and second material is hardened and dried. The hardening and drying can be provided by ultraviolet light or through irradiation of coating 2 with electron rays.

In the event that carrier 1 is identical to the impression cylinder, coating 2 will remain on carrier 1. In another instance, cylindrical shape 10 is removed from carrier 1 and coating 2. During an implementation, the first and second material is selected in a way that coating 2 is self-supporting and the surfaces of coating 2 are not adherent. This is why coating 2 is easily removable from cylindrical shape 10 and carrier 1. Coating 2 is afterwards stretched on an independent impression cylinder with the desired characteristics.

As described, according to this invention, expensive multiple-layer technologies are avoided. The coating is essentially formed in one manufacturing step. The result is a sleeve made of polyethylenterephthalate as carrier 1 with a conductive layer provided with a vapor application, and as coating 2, an individual photo-receptor layer that includes a mixture of an electron donator or electron acceptor with a thermally hardenable polymer. A pigment may be added to this polymer. As further example, the result is a sleeve made of aluminum as carrier 1 with a 0.5 micrometer thick barrier layer from a polymer and a two micrometer thick charge generation layer. Carrier 1 may be formed with coating 2 of a 20 micrometer thick charge transport layer. The latter includes a mixture of an electron donator or electron acceptor with a thermally hardenable polymer.

As discussed above, the instance has been considered in which the characteristics of coating 2 along thickness d were considered and influenced. A further possibility, concerns the instance when, the characteristics of cylindrical coating 2 along its axis is considered. The characteristics of coating are hereby controlled along its length l by the pre-selected velocity of drive unit 13. For this purpose, drive unit 13 is not constantly operated whereby cylinder 5 is removed from carrier 1 and cylindrical shape 10 at a non-constant velocity.

Figure 5:
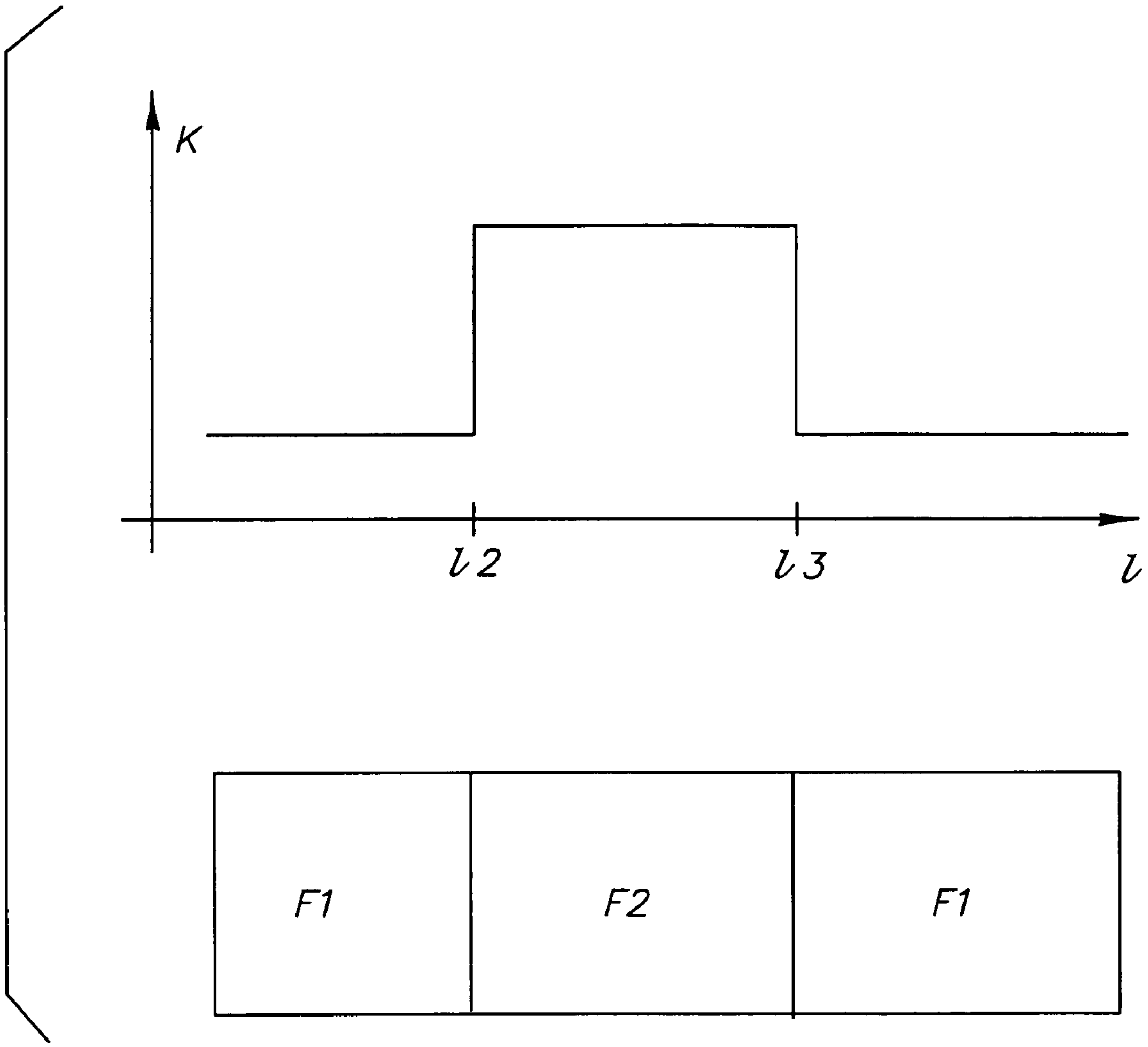
FIG. 5 is a representation of a special curvature of a coating characteristic as function of the length of the coating, and a lateral view of an impression cylinder with the coating with a depiction of a power distribution thereto.

FIG. 5 displays a material characteristic K as function of the length l along the axis of coating 2, which is formed in a cylindrical shape.

The curve that is shown in FIG. 5 is advantageous for the following reasons. In mating rolls or impression cylinder pairs, which mate with one another, the forces are unequally high along the long side of the rollers. This can be a disadvantage when paper is transported between the mating rolls and axially shift along the rollers due to different forces. The hard area of coating 2, shown in FIG. 5 as the area between l2 and l3, encompasses areas of the rollers or impression cylinders on which locally limited high forces have an effect (i.e., area F2 in FIG. 5), as the areas of the impression cylinder encompassed by coating 2, on which lighter forces work (i.e., areas Fl according to FIG. 5), which are embraced with coating areas of the curvature according to FIG. 5 which are smaller l2 or larger l3. In this way, a constant pressure is achieved along the length l of the impression cylinder with coating 2. Different forces at several areas at the surface of the impression cylinder with coating 2 are balanced by coating 2 formed in such a manner.

The invention has been described in detail with particular reference to certain preferred embodiments thereof, but it will be understood that variations and modifications can be effected within the spirit and scope of the invention.

What is claimed is:

1. A fixture (4) for the manufacturing of a coating (2) for an impression cylinder comprising: a carrier (1) and a cylinder shape (10) mounted in said fixture; a hollow cylinder (5) adapted to be inserted in between said carrier (1), and said cylinder shape (10); at least one valve (3,3') is provided for the injection of material into the spaces between the carrier (1), and said hollow cylinder (5)(the internal field (8)); and between said hollow cylinder (5) and said cylinder shape (10)(the external field (7); and a drive unit (13) to control the velocity of removal of said hollow cylinder (5) between said carrier (1) and said cylinder shape (10).

2. Fixture (4) according to claim 1, wherein said drive unit (13) controls the velocity of said hollow cylinder (5) at a pre-selected constant velocity.

3. Fixture (4) according to claim 1 wherein said drive unit (13) controls the velocity of said hollow cylinder (5) at a pre-selected non-constant velocity.

4. Fixture (4) according to claim 1, further including an ultrasonic generator for the improvement of the material flow.

* * * * *